May 24, 1966  P. K. TARRAN  3,252,537
MOTOR BICYCLE FRAME ARRANGEMENT PROVIDING A TUBULAR FUEL TANK
Filed April 20, 1964
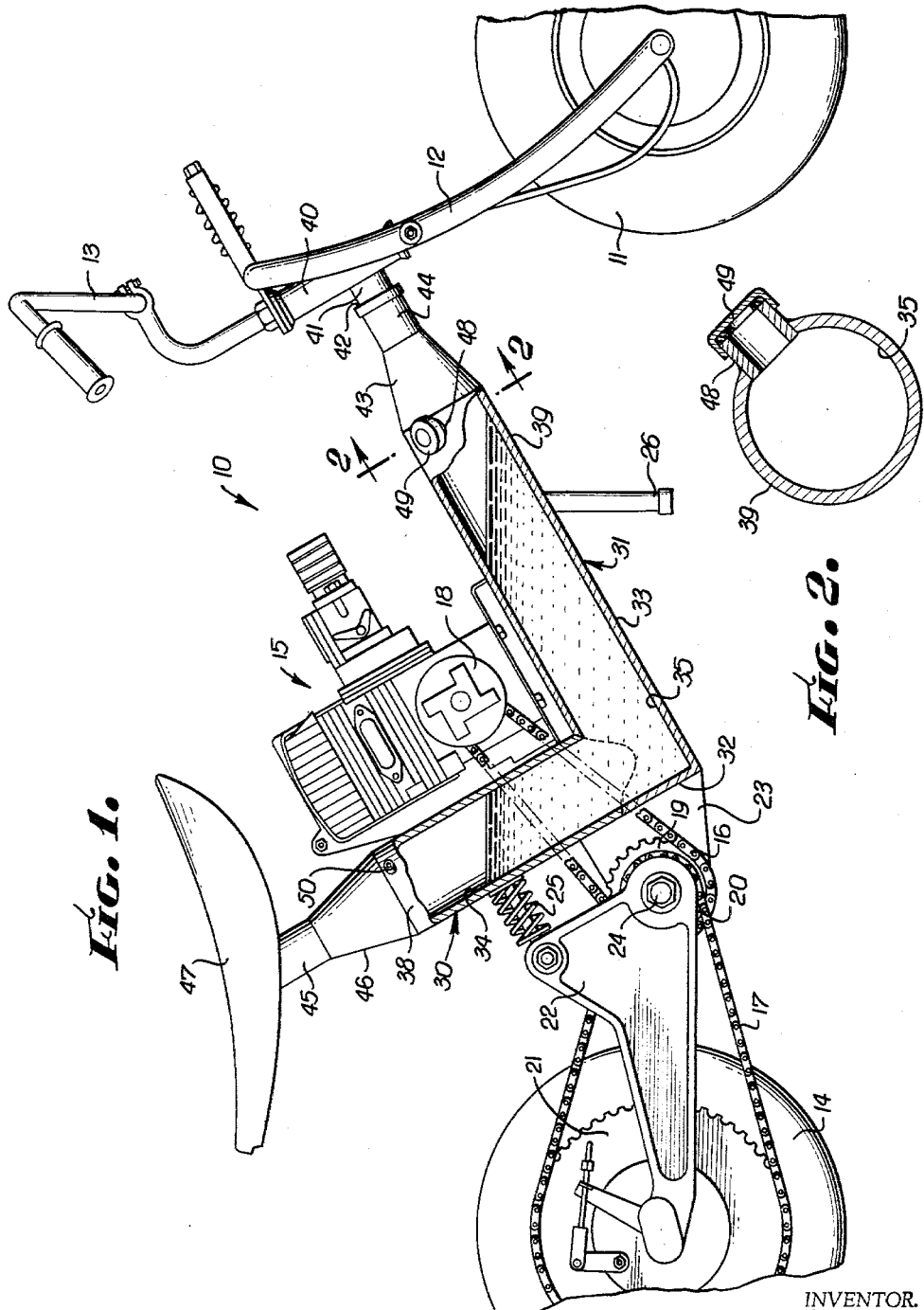
INVENTOR.
*Phil K. Tarran*
BY *Vernon D. Beehler*
ATTORNEY.

United States Patent Office 3,252,537
Patented May 24, 1966

3,252,537
MOTOR BICYCLE FRAME ARRANGEMENT
PROVIDING A TUBULAR FUEL TANK
Phil K. Tarran, San Bernardino, Calif., assignor to Microsound Inc., a corporation of California
Filed Apr. 20, 1964, Ser. No. 361,036
1 Claim. (Cl. 180—35)

The invention relates to motor bicycles and in particular a small, compact vehicle of this kind frequently designated in the trade as a miniature bike or micro-bike.

Small, compact motorized bicycles have recently been increasing in popularity. The trend has been to so construct small, sturdy motor bikes of this character that they can be readily operated by combustion engines of relatively low horsepower, but which, nevertheless, envisage a frame especially adapted to motor power in contrast to a bicycle type frame of the conventional sort to which some motive power has subsequently been added.

Because of the compactness of vehicles of this kind, there has been an appreciable problem in the design and mounting of an appropriate gas tank. As a practical matter, relatively little space is available on the usual frame for the mounting of necessary equipment for a gas tank which will permit it to be securely fastened in place so that it cannot be inadvertently dislodged. Problems are also encountered in selecting an appropriate place for a gas tank, isolated enough from the combustion engine to minimize the likelihood of danger of igniting fumes from the gas tank by operation of the combustion engine. Furthermore, since compact motor bikes of this kind need to be sold at a relatively low price, the vehicles are as a rule stripped to bare essentials, and the problem involved, both mechanically and economically in the supplying and mounting of a gas tank is one which has heretofore not been satisfactorily solved.

It is, therefore, among the objects of the invention to provide a new and improved miniature motor bike which is extremely economical of space used for the fuel supply.

Another object of the invention is to provide a new and improved fuel tank for a miniature type motor bike which needs virtually no extra space on the frame, but which is of ample capacity.

Another object of the invention is to provide a new and improved miniature type motor bike wherein the frame structure of the vehicle itself is used for a fuel tank.

Another object of the invention is to provide a new and improved motor bike device having a fuel tank which is located at a suitably safe location even though physically adjacent the combustion engine.

Still further among the objects of the invention is to provide a new and improved fuel tank forming part of the frame of a motor bike.

With these and other objects in view, the invention consists in the construction, arrangement and combination of the various parts of the device, whereby the objects contemplated are attained as hereinafter set forth, pointed out in the appended claims and illustrated in the accompanying drawings.

In the drawings:

FIGURE 1 is a side elevational view of a typical miniature type motor bike partially broken away to show the structure of the fuel tank.

FIGURE 2 is a cross-sectional view taken on the line 2—2 of FIGURE 1.

In an embodiment of the invention which is shown and described primarily for purposes of illustration, the vehicle is depicted as a motor bike or motorcycle consisting of a frame indicated generally by the reference character 10, a front wheel 11 at the lower end of a fork 12 manipulated by handle bars 13 and a rear wheel 14. A motor consisting of a combustion engine 15 rests upon the frame and operates through chains 16 and 17 together with sprockets 18, 19, 20 and 21 so as to drive the rear wheel. A rear chassis 22 connected to a main chassis section 23 at a pivot point 24 is provided with a shock absorber spring 25. Foot rests like the foot rest 26 extend below the frame.

The frame consists mainly of a seat post section 30 and a base section 31. A lower end 32 of the seat post section is joined to a lower end 33 of the base section to form a V-shaped frame, the rear chassis being connected to the section 23 which is located at the juncture of the seat post section with the base section. The seat post section 30 is tubular as is also the base section 31 and the interior of these tubular sections form a fuel tank. More particularly within the seat post section is a fuel chamber 34 and within the base section 31 is a fuel chamber 35 interconnected with each other so that together they form the fuel tank for the vehicle.

It is significant to note that a portion 38 of the seat post section 30 is relatively large in diameter over that portion of it which contains the fuel chamber 34. The same relatively large size holds true for a portion 39 of the base section 31 within which is located the fuel chamber 35. By making these sections of relatively large diameter, the wall material of the sections can be kept relatively thin while at the same time adding to the strength and rigidity of the frame because of their larger diameter. Both of these factors contribute materially to making it possible to provide a fuel tank of relatively large capacity which requires no special allotment or provision of space on the vehicle. In fact, by making the fuel tank large enough to provide adequate capacity, the structural features involving strength, ruggedness and rigidity are at the same time enhanced.

At the forward and upper end of the base section 31 a steering head 40 is attached, the steering head in turn supporting the fork 12 and handle bars 13. The steering head provides a closed end 41 surrounded by a liquid-tight welded seam 42 thereby closing off the corresponding end of the fuel chamber 35. A progressively narrowing portion 43 joins the portion 39 with a short tubular portion 44. Similarly, at the upper end of the seat post section there is provided a relatively short tubular portion or neck 45 joined to the portion 38 by a narrowing section 46. On the neck 45 is a conventional seat 47.

For filling the tank there is provided a filler neck 48 closed by a filler cap 49 secured over the upper end of the neck in a substantially conventional fashion. The filler neck 48 extends slightly to one side as shown in FIGURE 2 to make access to it easier. A vent fitting 50 is located near the top of the fuel chamber 34 to permit air to escape from the tank while it is being filled and to permit air to be returned later as fuel is drawn from the tank by operation of the combustion engine 15. In the alternative, use may be made of a conventional vented filler cap to allow air to enter the tank as the fuel is consumed. After the filling operation has been completed, the cap 49 is replaced and the engine 15 is ready for operation. There is, of course, a fuel line (not shown) from adjacent the bottom of the fuel tank to the combustion engine but inasmuch as fuel lines of this general sort are conventional and well known, it has been omitted from the drawings for purposes of clarity. If desired a shut-off valve may be provided for the vent to keep fuel from leaking out when the vehicle is laid on its side. By locating the vent as high as is shown, there will be no leaking during normal operation.

Moreover, located as shown the fuel tank is in a very handy location close to the combustion engine although substantially isolated from the engine from the point of view of operation. At the same time, the tank is compact and in a well protected position as a fuel tank should be. It is, moreover, located at substantially the center of mass of the motor bike as a whole so that the weight of the fuel, whether the tank be full or empty, will have no appreciable effect upon the balancing of the vehicle.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

A motor bike comprising a frame including a tubular seat post section having a closed upper end and a tubular base section having a closed upper end and joined at a rearward end thereof to a lower end of said seat post section, a seat mounted on the upper end of said seat post section, said sections having interconnected hollow interiors whereby to provide a fuel tank, a filler neck for the tank located at the upper end of the base section, a removable cap for said neck, and a vent opening located at the top of the seat post section whereby to vent trapped air and gases during filling of said tank, a rear chassis for mounting a rear wheel secured to the frame at the junction of said seat post section with said base section, and motor mounting means in a space between said sections above the junction of said seat post section with said base section.

References Cited by the Examiner

UNITED STATES PATENTS

| | | | |
|---|---|---|---|
| 714,571 | 11/1802 | Freed | 180—35 |
| 1,371,783 | 3/1921 | Goudard et al. | 180—135 |
| 1,878,976 | 9/1932 | Lesage | 180—33 |
| 2,604,179 | 7/1952 | Gilardi | 180—35 |

FOREIGN PATENTS

| | | |
|---|---|---|
| 694,200 | 7/1953 | Great Britain. |
| 700,248 | 11/1953 | Great Britain. |

KENNETH H. BETTS, *Primary Examiner.*